3,707,519
PROCESS FOR THE MANUFACTURE OF
STABILIZED POLYTETRAFLUOROETH-
YLENE DISPERSIONS
Helmut Hahn, Burghausen, Salzach, Germany (% Farb-
werke Hoechst AG., Frankfurt am Main, Germany)
No Drawing. Continuation of abandoned application Ser.
No. 767,814, Oct. 15, 1968. This application Feb. 8,
1971, Ser. No. 113,650
Claims priority, application Germany, Oct. 21, 1967,
F 53,863
Int. Cl. C08f 3/24, 45/28
U.S. Cl. 260—29.6 F                                    3 Claims

ABSTRACT OF THE DISCLOSURE

The present invention relates to aqueous dispersions of polytetrafluoroethylene which are stabilized by means of terpene hydrocarbons. The stabilized dispersions are obtained by polymerizing tetrafluoroethylene in the presence of 2 to 25 p.p.m., calculated on the total reaction mixture, of terpene hydrocarbons. The dispersions may contain up to 25% by weight of colloidal polytetrafluoroethylene.

---

This application is a continuation application of Ser. No. 767,814, filed Oct. 15, 1968, now abandoned.

The present invention relates to a process for the manufacture of stabilized polytetrafluoroethylene dispersions.

It has already been described that in the polymerization of tetrafluoroethylene to give rise to polytetrafluoroethylene the properties of the polymer, especially as regards the coating of metals, can be substantially improved by the addition of colloidal polytetrafluoroethylene. However, this addition may not exceed a certain amount, i.e. 1%, calculated on the aqueous liquor placed in the reaction vessel, as described, for example, in U.S. Pat. No. 3,088,941. An increase of the addition of colloidal polytetrafluoroethylene, which would further improve the suitability of the polymer for metal coating and other known uses, however, would result in the coagulation of the dispersed polytetrafluoroethylene. Neither is it possible to increase the proportion of colloidal polytetrafluoroethylene by the addition of white oils, paraffins or other known agents without substantial coagulation occurring during the reaction which may result in the total precipitation of the polytetrafluoroethylene.

Now I have found a process for the manufacture of stabilized aqueous polytetrafluoroethylene dispersions by polymerizing tetrafluoroethylene, which comprises carrying out the polymerization of tetrafluoroethylene in the presence of 2 to 25 p.p.m., preferably 5 to 15 p.p.m., calculated on the total reaction mixture, of terpene hydrocarbons or the oxygen-containing derivatives thereof, or mixtures of terpene hydrocarbons with the oxygen-containing derivatives thereof.

As terpene hydrocarbons there may be used with special advantage terpinene, dipentene, camphene, as oxygen-containing derivatives terpineol or camphor. There has proved to be especially useful a mixture consisting of 5% to 10% weight of camphene, α-terpinene and γ-terpinene in an amount of from 8% to 15% by weight, respectively, 30% to 35% by weight of dipentene, 35% to 40% by weight of terpinolenue and 1% to 7% by weight of cymene, commercially available, for example, under the trade-name Depanol®.

With these additives according to the invention, the amount of colloidal polytetrafluoroethylene may be increased above 1% by weight up to and including 25% by weight without running the risk that coagulation may occur. It was not to be expected that this effect would be attained by adding exactly these additives since the additives of the invention have been known and employed heretofore for inhibiting polymerization, above all as stabilizers for the monomeric tetrafluoroethylene. It was surprising, therefore, that these additives of the invention, when employed in the indicated proportions, could be added to the polymerization batch to prevent coagulation and that, within this range of application, they did not disturb the progress of the polymerization.

The polymerization of tetrafluoroethylene may be carried out according to known methods, for example with a redox system at low temperatures or with a peroxidic initiator alone at elevated temperatures. The additives according to the invention are either placed with the basic liquor in the polymerization vessel before the polymerization starts or they are metered into the polymerization batch in the course of the polymerization by means of proportioning pumps. The rate at which the polymerization proceeds is not retarded by these additives; the polymerization proceeds at a normal rate with the formation of practically no coagulum.

The dispersions which have formed may be concentrated in the presence of auxiliary emulsifiers to form dispersions of 60% strength. The dispersions possess excellent improved properties with respect to the formation of films which renders them especially suitable for coating metal surfaces. By dipping or spraying there may be obtained, in a single stage, polytetrafluoroethylene coatings of a thickness within the range of from 25 to 40 microns which are practically free from cracks and, thereby, far superior to the coatings obtained with dispersions which do not contain these additives, not only with regard to the thickness of the coating obtained but also with regard to the freedom from cracks.

Also the polytetrafluoroethylene precipitated from the dispersions of the invention possesses noticeably improved properties as compared with the precipitated products from dispersions that do not contain the novel additives. It is especially suitable for paste extrusion, particularly for the manufacture of transparent pipes of high ultimate tensile strength.

The following examples serve to illustrate the invention but they are not intended to limit it thereto, the percentages being by weight:

EXAMPLE 1

50% of the capacity of an agitator autoclave was filled with distilled water to which had been added a dilute polytetrafluoroethylene dispersion in such an amount that the content of colloidal polytetrafluoroethylene in the total mixture amounted to 1.3%. To the batch was added, calculated on the total mixture, 0.088% of perfluoroctanic acid, 0.11% of ammonia solution of 18% strength and 6.2% of white oil and finally 6.3 p.p.m. of a terpene mixture commercially available under the trade-name of Depanol®. In the presence of an initiator system consisting of 44 p.p.m. sodium bisulfite, 64 p.p.m. ammonium persulfate and 0.5 p.p.m. copper sulfate, and under a pressure of 19 atmospheres gage, at a temperature of 28° C. and with agitation at a rate of 225 r.p.m., there was incorporated into the batch, by polymerization, such an amount of tetrafluoroethylene that a dispersion of about 30% strength was obtained. Only about 0.2% of the tetrafluoroethylene incorporated by polymerization was present in the form of a coagulum.

However, when the above-described process was carried out without the additive of the invention, the polymerization had to be discontinued already when a dispersion of about 15% strength had formed owing to coagulum having formed in a high degree. In this case the formation of coagulum amounted to 16%.

EXAMPLE 2

The polymerization of tetrafluoroethylene was carried out as described in Example 1 except that the polymerization liquor contained 10% colloidal polytetrafluoroethylene, calculated on the total amount of water placed in the reaction vessel, and, moreover, 12.5 p.p.m. of Depanol®. A dispersion having a content of 30% of polytetrafluoroethylene was obtained. The formed coagulum amounted to less than 1%.

EXAMPLE 3

The polymerization of tetrafluoroethylene was carried out as described in Example 1 except that 6.3 p.p.m., calculated on the total liquor, of camphene was added. A dispersion having a polytetrafluoroethylene content of 29% was obtained, while the coagulum formed amounted to 0.1 to 0.3%.

EXAMPLE 4

Instead of 6.3 p.p.m. of camphene (Example 3), there was added 6 p.p.m. of dipentene. Also in this case a polytetrafluoroethylene dispersion of 29% to 30% strength was obtained, while the coagulum formed amounted to 0.1 to 0.3%.

EXAMPLE 5

The polymerization was carried out in the same manner as described in Example 1, except that 12.5 p.p.m. camphene was added. A polytetrafluoroethylene dispersion of 30% strength was obtained. The coagulum formed amounted to 0.3%.

EXAMPLE 6

In the polymerization process as described in Example 1, there was added 20% colloidal polytetrafluoroethylene, calculated on the total amount, moreover, 12.5 p.p.m. of a terpene mixture containing preponderantly dipentene and terpinolene. A polytetrafluoroethylene dispersion was obtained with a polytetrafluoroethylene content of about 32%. The coagulum that had formed amounted to less than 0.2%.

EXAMPLE 7

To an aqueous liquor there was first added such an amount of a polytetrafluoroethylene dispersion that the total content of colloidal polytetrafluoroethylene, calculated on the liquor, amounted to 1.2%; then 0.113% of perfluoroctanic acid, 0.15% of ammonia water of 18% strength, 0.5 p.p.m. of copper sulfate, 35 p.p.m. of sodium bisulfate and 5 p.p.m. of Depanol® was added thereto. After tetrafluoroethylene had been introduced until a pressure of 19 atmospheres gage was established, the polymerization was started by introducing 56 p.p.m. of ammonium persulfate by pumping. The polymerization was continued until a content of 24% of polytetrafluoroethylene was obtained; the coagulum formed amounted to 0.5% of the tetrafluoroethylene applied.

I claim:

1. In a process for the manufacture of stabilized aqueous polytetrafluoroethylene dispersions by emulsion polymerization of tetrafluoroethylene, the improvement which comprises adding to the polymerization 2 to 25 p.p.m. by weight, calculated on the total polymerization liquor, of terpene hydrocarbons or oxygen-containing derivatives thereof selected from the group consisting of terpinene, dipentene, terpinolene, camphene, terpineol, camphor and mixtures of these, and said polymerization liquor containing 1 to 25% by weight of colloidal polytetrafluoroethylene.

2. The process as claimed in claim 1, wherein the said terpene hydrocarbons or the oxygen-containing derivatives thereof are used in an amount within the range of 5 to 15 p.p.m., calculated on the total reaction mixture.

3. The process as claimed in claim 1, wherein there is added to the reaction mixture a mixture composed of 5% to 10% by weight of camphene, α-terpinene and γ-terpinene in an amount within the range of 8% to 15% by weight, respectively, 30% to 35% by weight of dipentene, 35% to 40% by weight of terpinolene and 1% to 7% by weight of cymene.

References Cited

UNITED STATES PATENTS

| | | | |
|---|---|---|---|
| 3,088,941 | 5/1963 | Uhland | 260—92.1 R |
| 2,753,329 | 7/1956 | Kroll et al. | 260—92.1 R X |
| 2,737,533 | 3/1956 | Marks et al. | 260—92.1 R X |

DONALD J. ARNOLD, Primary Examiner

J. B. LOWE, Assistant Examiner

U.S. Cl. X.R.

260—298, 92.1 R